United States Patent
Stayner

[15] 3,679,857
[45] July 25, 1972

[54] STABLE DIELECTRIC FLUID FOR ELECTRICAL DISCHARGE MACHINING COMPRISING A MINERAL OIL, A METAL SULFONATE AND A PHENOLIC ANTIOXIDANT

[72] Inventor: Robert A. Stayner, Palos Verdes Estates, Calif.

[73] Assignee: Chevron Research Company, San Francisco, Calif.

[22] Filed: March 22, 1971

[21] Appl. No.: 126,981

Related U.S. Application Data

[62] Division of Ser. No. 735,578, June 10, 1968.

[52] U.S. Cl. ...........................................219/69 D
[51] Int. Cl. ...............................................B23p 1/08
[58] Field of Search .................................219/69 D

[56] References Cited

UNITED STATES PATENTS 3,334,210   8/1967   Williams et al. ..................219/69 D

*Primary Examiner*—R. F. Staubly
*Attorney*—A. L. Snow et al.

[57] ABSTRACT

A method for shaping an electrically conductive material by means of electrical discharge machining employing as a dielectric fluid a primarily aliphatic light oil of low viscosity having in minor amounts an oil-soluble metal sulfonate detergent and a phenolic antioxidant.

1 Claim, No Drawings

STABLE DIELECTRIC FLUID FOR ELECTRICAL DISCHARGE MACHINING COMPRISING A MINERAL OIL, A METAL SULFONATE AND A PHENOLIC ANTIOXIDANT

CROSS-REFERENCE TO RELATED APPLICATIONS

This application is a division of application Ser. No. 735,578, filed June 10, 1968.

BACKGROUND OF THE INVENTION

FIELD OF THE INVENTION

Electrical discharge machining is particularly useful for precision machining. The economics of electrical discharge machining are governed to a great extent by the wear rate of the electrode and the rate of cutting of the workpiece. The dielectric fluids used can effect changes in both of these.

The dielectric fluid acts as a carrier of the charge from the electrode to the workpiece. Furthermore, it serves to remove detritus which results from the vaporization and cooling of the metal which evaporates from the surface of the workpiece due to the thermal action of the sparks. In practice, the dielectric fluid is recycled, being collected from the apparatus, filtered by a convenient filtration means such as a diatomaceous earth and then returned to the apparatus. The dielectric fluid also serves to cool the workpiece, so that the crystal structure of the body of the workpiece remains substantially the same.

Satisfactory fluids should have controlled dielectric properties so as to provide a sizable charge flowing from the electrode to the workpiece, should be of a light color so that the workpiece can be observed through the oil, should be able to carry detritus to the filter for filtration, and should be oxidatively and thermally stable for long periods of time.

SUMMARY OF THE INVENTION

Compositions are provided for electrical discharge machining which have excellent stability, remain transparent for long periods of time, prevent deposition of detritus and deposit-forming organic material, and maintain a useful dielectric constant, the compositions comprising an oil of lubricating viscosity having a minor aromatic content, an alkaline earth organic sulfonate and a phenolic antioxidant.

DESCRIPTION OF THE PREFERRED EMBODIMENTS

The compositions of this invention are primarily comprised of a gas oil, an alkaline earth metal organic sulfonate detergent, an antioxidant and optionally minor amounts of other additives. The first material to be considered will be the base oil.

Gas oil is a general term originally applied to a petroleum distillate boiling between kerosene and lubricating oils. Kalichevsky-Kobe, Petroleum Refining With Chemicals, Elsevier Pub. Co., New York, (1956), p. 23. The gas oils which are preferred for use in this invention are lightly acid treated and boil from about 400° to 600° F.

The flash point of the oil will generally be at least 200°F. and preferably at least 215°F., usually not exceeding 300°F. (COC). The viscosity at 100°F. will be fairly low, usually at least about 30 SSU and not exceeding about 50 SSU. The aniline point will be at least 100°F. and usually will be in excess of 100°F. not exceeding 160°F. Ordinarily, there will be from about 10 to 30 weight percent of aromatics in the composition, the remaining composition being aliphatic and naphthenic. The oil is substantially free of aliphatic unsaturation (<5 weight percent olefins).

The organic sulfonate which is added is an oil soluble alkaline earth metal organic sulfonate. The alkaline earth metals which find use are calcium and barium, calcium being preferred. The organic sulfonates which find use may be neutral (stoichiometric equivalence of metal and acid) or have as much as 0.5 mole excess of the metal as basic metal, e.g., hydroxide or carbonate. Usually, the organic sulfonate will be substantially neutral.

Any of the alkaline earth metal organic sulfonates which find use as lubricating oil detergents may be used. Descriptions of the various sulfonates may be found in U.S. Pat. Nos. 2,485,861, 2,501,732, and 2,270,577. The sulfonic acids may be derived from natural petroleum sources and are referred to as the mahogany sulfonates. Other sulfonic acids may be prepared from alkyl substituted benzenes having alkyl substituents of from about eight to 30 carbon atoms. The sulfonate detergent will generally be of at least 15 carbon atoms and usually not greater than 75 carbon atoms, more usually of from about 20 to 50 carbon atoms.

The particular method or the particular sulfonic acid which is used to prepare the alkaline earth metal organic sulfonate is not critical to the use of the composition in this invention.

The amount of sulfonate which will be used will be sufficient to provide from about five to 30 ppm in the final fluid. The amount of the material should not reduce the dielectric strength of the final composition below 8 kv. The dielectric strength of the electrical discharge machine fluid will generally be in the range of about 10 to 40 kv, more usually of from about 12 to 35 kv. During the course of use of the electrical discharge machining fluid, some of the sulfonate may be depleted with a concomitant increase in the dielectric strength of the fluid.

The final additive is the antioxidant which is a phenolic compound having the following formula:

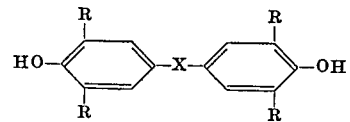

wherein X is a bond, methylene, isopropylidene, or sulfur and R is a tert.-alkyl group of from four to five carbon atoms, i.e., tert.-butyl and tert.-amyl.

The antioxidants which find use in this invention are, therefore, bis-phenols having tert.-alkyl groups in the ortho positions and para attachment between the phenolic groups.

The antioxidant will generally be added in about 0.005 to about 0.1 weight percent, more usually of from about 0.008 to about 0.05 weight percent.

Various other additives may also be included, such as masking agents and odorants to provide a pleasant fragrance and hide the characteristic hydrocarbon odor of the base oil which may be objectionable.

The compositions of this invention may be readily prepared by merely mixing the ingredients at an elevated temperature, usually of from about 120° to 175°F. and stirring until homogeneous.

The following composition was prepared when 100 parts of gas oil having the following properties was combined with 0.005 weight percent of calcium mahogany sulfonate having 1.67 weight percent calcium, prepared by the sulfonation of 480 neutral oil and neutralization with calcium, and 0.01 percent of the methylene (bis-[2,6-di-(tert.-butyl)phenol]).

TABLE I

| | |
|---|---|
| Gravity, °API | 37.5 |
| Aniline Point, °F. | 146.5 |
| Flash Point, °F., COC | 215 |
| Viscosity/100°F., SSU | 34.0 |
| Neutralization No. | 0.01 |
| Hydrocarbon Analysis, % | |
| Saturates | 79 |
| Olefins | 1 |
| Aromatics | 20 |
| Distillation, D–86, °F. | |
| Initial Boiling Point | 430 |
| 50% | 478 |
| 90% | 507 |
| End Point | 540 |

Also included was an odorizer (Deodall No. 1 in an amount of 0.005 weight percent. The final product had the following properties:

TABLE II

| | | |
|---|---|---|
| Gravity, °API | ASTM D–287 | 36.7 |
| Flash Point, °F. | ASTM D–92 | 220 |
| Aniline Point, °F. | ASTM D–1012 | 145 |
| Viscosity at 100°F. SSU | ASTM D–2161 | 34.0 |
| Sulfonates, ppm | | 12 |
| Dielectric Strength, kv | | 13 |
| ASTM Color | | <1 |

This composition was used commercially with electrical discharge machines over a period of 3 months, where only makeup oil was used to replenish oil lost mechanically. The oil stayed substantially transparent over this time and provided significant improvement over the oil which had been previously used. The work time was reduced; the wear of electrodes was diminished and the reuse of the oil was greatly extended.

As will be evident to those skilled in the art, various modifications on this invention can be made or followed, in the light of the foregoing disclosure and discussion, without departing from the spirit or scope of the disclosure or from the scope of the following claims.

I claim:

1. A method for shaping an electrically conducting material by means of electrical discharge machining which comprises applying an electrical discharge from an electrode die to a workpiece through dielectric fluid comprising:

a mineral oil having a flash point of at least 200°F., a viscosity at 100°F. in the range of 30 to 50 SSU, and from about 10 to 30 weight percent aromatics and substantially free of aliphatic unsaturation;

from about 5 to 30 ppm of an oil soluble alkaline earth metal organic sulfonate; and, from 0.005 to about 0.1 of a phenolic compound of the formula:

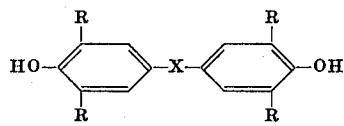

wherein X is a bond, methylene, isopropylidene or sulfur and R is a tert-alkyl group of from four to five carbon atoms, and wherein the final composition has a dielectric strength in the range of 8 to 40 kv.

* * * * *